(12) United States Patent
Slayter et al.

(10) Patent No.: US 10,260,615 B2
(45) Date of Patent: Apr. 16, 2019

(54) VENTED GEAR SPLINE LUBRICATION

(71) Applicant: Hamilton Sundstrand Corporation, Charlotte, NC (US)

(72) Inventors: Matthew Allen Slayter, Rockford, IL (US); Michael R. Blewett, Stillman Valley, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 145 days.

(21) Appl. No.: 14/961,086

(22) Filed: Dec. 7, 2015

(65) Prior Publication Data

US 2017/0159796 A1  Jun. 8, 2017

(51) Int. Cl.
| | | |
|---|---|---|
| *F16H 57/027* | (2012.01) | |
| *F16H 57/04* | (2010.01) | |
| *F01D 25/18* | (2006.01) | |
| *F02C 7/32* | (2006.01) | |
| *F16N 7/36* | (2006.01) | |

(52) U.S. Cl.
CPC .......... *F16H 57/027* (2013.01); *F01D 25/18* (2013.01); *F02C 7/32* (2013.01); *F16H 57/043* (2013.01); *F16H 57/0431* (2013.01); *F16H 57/0434* (2013.01); *F16H 57/0456* (2013.01); *F16N 7/363* (2013.01); *F05D 2260/608* (2013.01)

(58) Field of Classification Search
CPC ... F16H 57/043; F16H 57/0431; F16H 57/027
See application file for complete search history.

(56) References Cited

U.S. PATENT DOCUMENTS

| | | | |
|---|---|---|---|
| 3,621,937 A | 11/1971 | Edge | |
| 3,637,049 A | 1/1972 | Butterfield | |
| 3,757,535 A | 9/1973 | Stein | |
| 4,013,141 A | 3/1977 | James | |
| 5,119,905 A | 6/1992 | Murray | |
| 5,545,104 A | 8/1996 | Tilley | |
| 5,704,863 A | 1/1998 | Zalewski et al. | |
| 8,678,937 B2 | 3/2014 | Humes | |
| 8,863,905 B2 | 10/2014 | Moriguchi | |
| 8,899,910 B2 | 12/2014 | Makulec | |

(Continued)

FOREIGN PATENT DOCUMENTS

| | | |
|---|---|---|
| DE | 102012018603 A1 | 3/2014 |
| EP | 0408454 A1 | 1/1991 |

(Continued)

OTHER PUBLICATIONS

European Search Report for Application No. 16202519.1-1603 dated May 8, 2017. 8 Pages.

(Continued)

*Primary Examiner* — William Kelleher
*Assistant Examiner* — Gregory T Prather
(74) *Attorney, Agent, or Firm* — Cantor Colburn LLP (57) ABSTRACT

A gearbox assembly includes an outer housing and a gear box shaft at least partially disposed in the outer housing. The gear box shaft includes an interior region and a reservoir dam that separates the interior region into a reservoir volume and a spline volume. The reservoir dam has a vent hole formed therein that passes through it such that a surface of the dam is in fluid communication with a region defined by the outer housing and outside of the gear box shaft.

12 Claims, 7 Drawing Sheets

(56) References Cited

U.S. PATENT DOCUMENTS

| | | |
|---|---|---|
| 8,992,192 B2 | 3/2015 | Shah |
| 9,163,767 B2 | 10/2015 | Norem et al. |
| 9,347,545 B2 | 5/2016 | Hensel |
| 9,829,087 B2 | 11/2017 | Beier |
| 9,932,860 B2 | 4/2018 | Stutz et al. |
| 2011/0081975 A1 | 4/2011 | Anema |
| 2011/0129291 A1 | 6/2011 | Humes |
| 2014/0014662 A1 | 1/2014 | Hensel |
| 2015/0345615 A1 | 12/2015 | Beisel et al. |
| 2015/0369355 A1* | 12/2015 | Beier ................. F16D 1/10 74/468 |
| 2016/0040776 A1 | 2/2016 | Cradit et al. |
| 2016/0097445 A1 | 4/2016 | Jongebloed |
| 2017/0159795 A1* | 6/2017 | Slayter ............. F16H 57/027 |
| 2017/0335938 A1* | 11/2017 | Sugimoto ........... F16H 47/02 |

FOREIGN PATENT DOCUMENTS

| | | |
|---|---|---|
| EP | 2615345 A2 | 7/2013 |
| WO | 2014165138 | 10/2014 |

OTHER PUBLICATIONS

European Search Report for Application No. 16202535.7-1603, dated May 8, 2017. 7 Pages.

\* cited by examiner

VENTED GEAR SPLINE LUBRICATION

TECHNICAL FIELD

The present disclosure generally relates to lubrication, and more particularly, to a spline lubrication system that includes a vent.

BACKGROUND

Certain mechanical systems include a driving shaft and a driven shaft. The driving shaft may be part of, for example, a gear box and the driven shaft may be part of an accessory of receives rotational energy from the driving shaft. The two shafts may be joined by a spline joint.

A spline joint may include splines (ridges or teeth) on a drive shaft that mesh with grooves in a mating piece and transfer torque to it, maintaining the angular correspondence between them. For instance, the driving shaft may include a male spline on the shaft that matches the female spline on the driven shaft or vice versa.

In operation, the spline joint may need lubrication from time to time.

BRIEF DESCRIPTION

According to one embodiment, a gear box assembly is disclosed. The gearbox assembly includes an outer housing and a gear box shaft at least partially disposed in the outer housing. The gear box shaft includes an interior region and a reservoir dam that separates the interior region into a reservoir volume and a spline volume. The reservoir dam has a vent hole formed therein that passes through it such that a surface of the dam is in fluid communication with a region defined by the outer housing and outside of the gear box shaft.

According to another embodiment, a power delivery system is disclosed. The system includes a driven shaft and a gear box assembly. The gear box assembly includes an outer housing and a gear box shaft at least partially disposed in the outer housing and connected by a spline joint to the driven shaft. The gear box shaft includes an interior region and a reservoir dam that separates the interior region into a reservoir volume and a spline volume. The reservoir dam has a vent hole formed therein that passes through it such that a surface of the dam is in fluid communication with a region defined by the outer housing and outside of the gear box shaft.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

FIG. 8 is a cross-sectional side view of a gear box driving an accessory where the gear box has a vent formed there through.

DETAILED DESCRIPTION

Disclosed herein are systems and methods that can lubricate a joint between two shafts and that is resistance to failures in a sealing element (e.g., an o-ring) that seals oil or other lubricants from leaving the system through the joint between the shafts. It shall be understood that while a spline joint is used in the following description, the teachings herein can be applied to any type of connection between two shafts that need to be connected together.

As described above, a spline joint may need lubrication. One manner to provide such lubrication is to utilize a so-called "one shot" lubrication system that provided lubrication every time the connected shafts stop spinning. The inventors hereof have found that such lubrication systems may have limitations when a sealing element fails that result in a loss of lubricant during operation of the system/joint at high altitude. To best understand the inventive nature of the system/method disclosed herein a brief description of an example one shot system is first provided and described in the context of a gear box shaft connected to an accessory shaft in an air craft. The accessory shaft as the term is used herein may refer to an input or output of any element on an aircraft that either generates of receives rotational energy. Examples include, but are not limited to, starters, constant speed drives, generators, hydraulic pump(s), and the hydromechanical engine fuel controls. The gear box shaft may be an input to or an output from a gear box. Depending on the context, either of the accessory or gear box shafts may be referred to as the driving shaft with the other being referred to as the driven shaft. However, for simplicity the following description may describe systems where the gear box shaft is the driving shaft and the accessory shaft is the driven shaft.

Figures 1A, 1B:
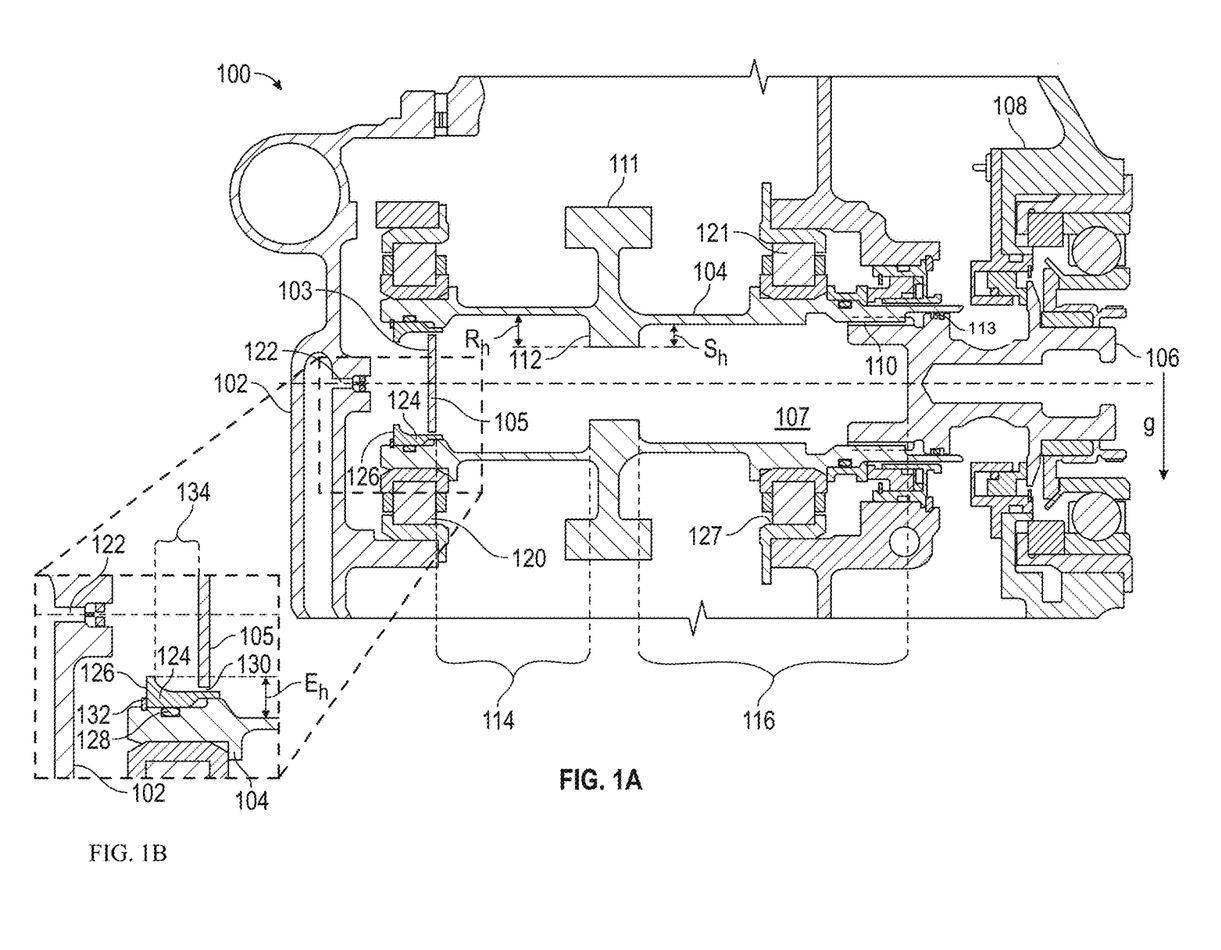
FIGS. 1A and 1B show, respectively, a cross-sectional side view of a gear box driving an accessory and a magnified section thereof.

FIG. 1A shows a system 100 with a gear box 102 having a gear box (or driving) shaft 104 connected to an accessory (or driven) shaft 106. The gear box 102 may be connected to an aircraft turbine or a ram air fan in one embodiment and may be referred to as an accessory gear box denoting that it provided rotational energy to an accessory. Further, the gear box 102 may define a closed cavity within which some or all of the gear box shaft 104 is housed. An exterior gear 111 is coupled to or integrally formed around an outer surface of the gear box shaft 104 such that it can receive and re-transmit rotational energy received, for example, from the turbine or ram air fan and provide to another element such as accessory 108.

For example, and now referring to the gear box shaft 104 as the driving shaft and the accessory shaft 106 as the driving shaft, the driving shaft 104 is coupled to the driven shaft 106 by a spline joint 110 such that rotational energy is transferred to the driven shaft 106. The particular configuration of the spline joint 110 can be selected from all known configurations of such joints. The spline joint 110 is sealed by a sealing element such as o-ring 113 to prevent a fluid (e.g., lubricant) from escaping an interior region 107 of the driving shaft 104. Such fluid may otherwise be lost to the atmosphere if not sealed. If enough fluid is lost, mechanical errors may occur.

The interior region 107 includes two volumes, a reservoir volume 114 and spline volume 116. The two volumes are separated and defined by a reservoir dam 112. More particularly, the reservoir volume 114 is defined by the toroid formed during rotation and having a thickness (e.g., height) as defined by Rh and, similarly, the spline volume 116 is defined by the toroid formed during rotation and having a thickness (e.g., height) as defined by Sh. The precise volume and how to determine such is known in the art and may be determined by the skilled artisan. Further, the heights Rh and Sh may be selected (as well as the lengths of the volumes where the length is measured in the axial direction) such that a specific amount of lubricant is delivered to the spline joint 110 each time the system restarted. For example, the height and lengths may be selected such that each time an aircraft takes off a particular amount of lubricant is delivered to the joint 110 as is more fully described below.

The driving shaft 104 is supported by bearings 120 and 121 which allow for the driving shaft 104 to rotate within the gear box 102. It shall be understood that fluid from the interior region 107 of the driving shaft 104 or introduced upstream of the driving shaft 104 may return to an interior region of the gear box 102 through bearing 120 as it may settle in the direction of gravity (shown by arrow g) when the aircraft is not operating (e.g. when the driving shaft is not turning).

The gear box 102 includes a lubrication jet 122 that provide a lubricant into the system (e.g., into shaft 104). The end of the driving shaft 104 opposite the spline joint 110 includes a lubricant regulator (or regulator) 103.

Figure 2:
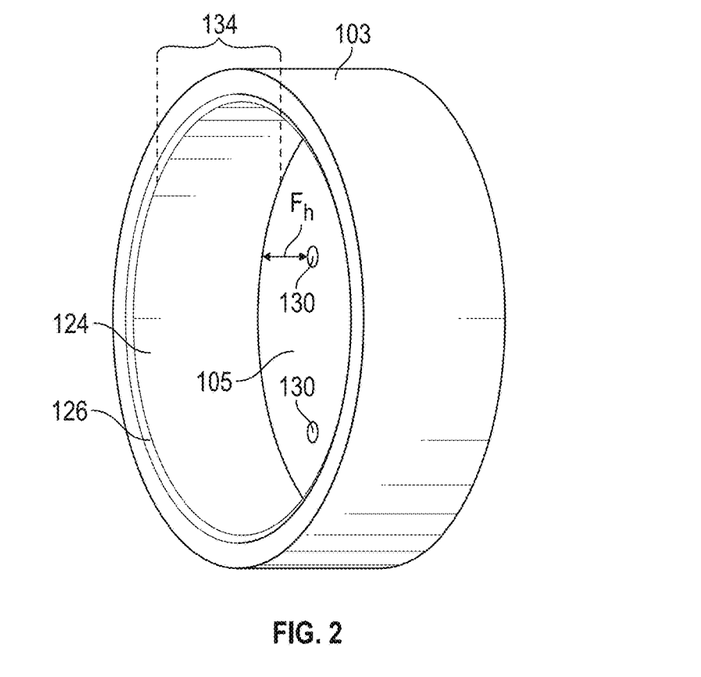
FIG. 2 is a perspective view of a reservoir according to one embodiment.

With reference now to FIGS. 1A-1B and 2, details of the regulator 103 are described. The regulator 103 is a generally circular element that includes a perforated base 105 that includes one or more feed holes 130 formed therein. The regulator 103 also includes a tubular sidewall 124. As will be understood from the below, the feed holes 130 are locate a distance Fh from the sidewall 124. At an opposite end of the regulator 103 from the base 105 a lip referred to as a feed dam 126 is provided on the regulator 103. As more fully described below, the length of the sidewall 124 and the height of the feed dam 126 define a feed volume 134. In one embodiment, a regulator retaining ring 132 holds the regulator 103 in place and a regulator sealing ring 120 may also be provided.

During operation (e.g., while an aircraft is running), lubrication jet 122 may direct lubricant towards the regulator 103. Some of this lubricant may enter the interior region 107 as described below. The amount is dependent on the sever factors including Fh, and a distance from an interior wall of the interior region 107 to the top of the feed dam 126 that defines an entry height (shown as Eh).

Figure 3:
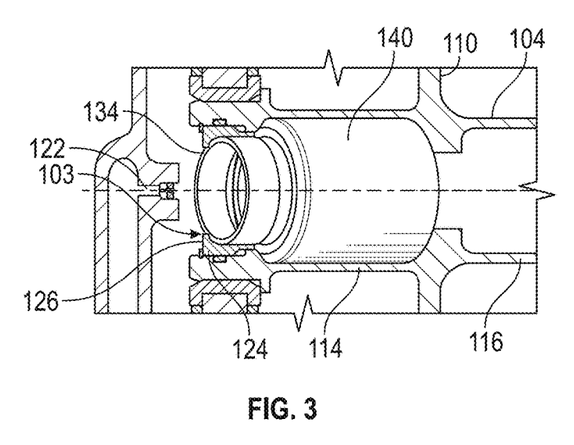
FIG. 3 is a partial view of the cross-section of the gear box of FIG. 1 illustrating a lubricant toroid formed when a gear box shaft is rotating.

With reference now to FIGS. 1-3, during operation the lubricant will form a regulator toroid 134 and a reservoir toroid 140. The feed dam 126 and the sidewall 124 define the volume of the regulator toroid 134. The entry height Eh and a length from the base 105 to the reservoir dam 112 defines the volume of the reservoir toroid 140. As will be understood, while spinning the distance from a centerline of the driving shaft to an internal diameter of both the regulator toroid 134 the reservoir toroid 140 and is set by the height of the feed dam 126. Also, the volume of the reservoir toroid 140 is depending on the entry height Eh and a distance from the base 105 to the reservoir dam 110.

Stated differently, lubrication is supplied through the feed jet 124 that such that the feed volume fills defining a torus of lubrication (regulator toroid 134). Further, the lubricant drains through feed holes 130 into the interior region 107. As discussed above, the reservoir volume 114 fills to the level of feed dam 126 (e.g., Eh) as reservoir toroid 140. Any excess lubricant flows back over feed dam 126 into the gear box 102. In this manner, the levels of the regulator toroid 134 and a reservoir toroid 140 remain constant while the driving shaft 104 is spinning.

Figure 4:
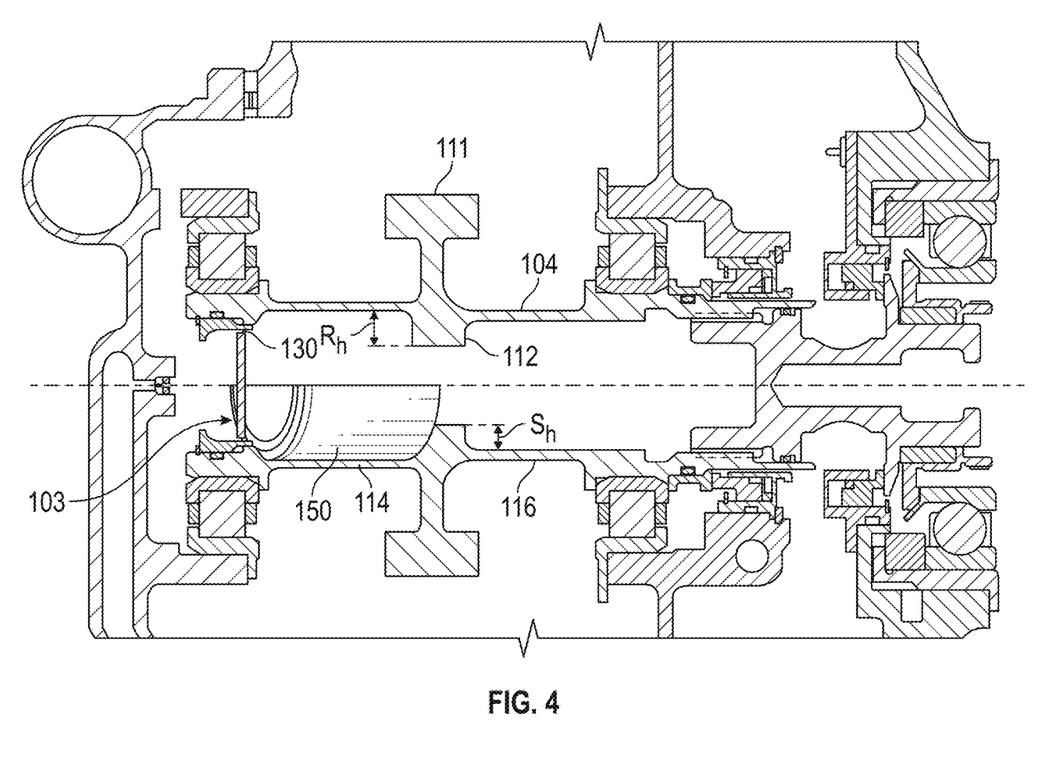
FIG. 4 is a view of the cross-section of the gear box of FIG. 1 illustrating a lubricant pool formed when a gear box shaft initially stops rotating.
Figure 5:
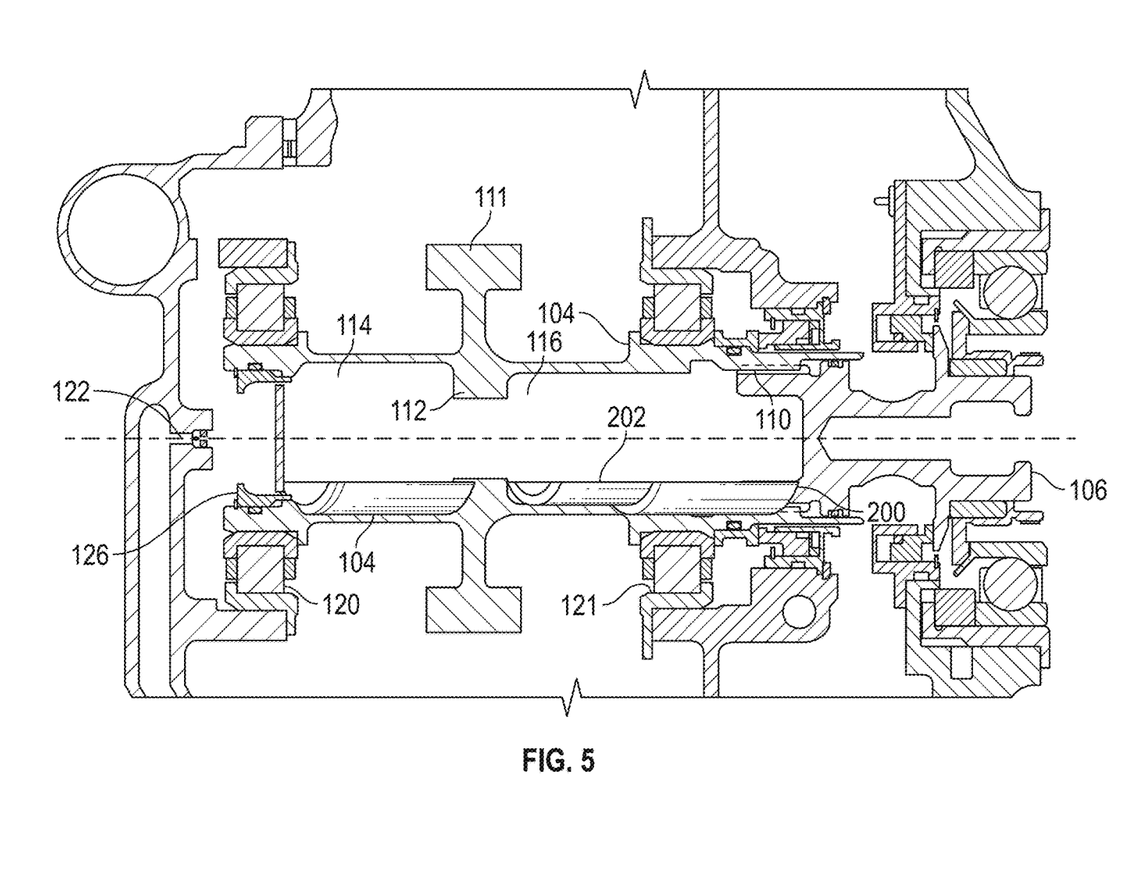
FIG. 5 is a view of the cross-section of the gear box of FIG. 1 illustrating the lubricant pool formed after the gear box shaft stops rotating at a time after the lubricant has flowed back through the feed holes.

With reference now to FIGS. 4 and 5, when the reservoir toroid 140 collapses into chordal volume 150 which is higher than reservoir height Rh. In one embodiment, the feed holes 130 are sized small enough that a majority of the lubricant flows over the reservoir dam 110 into spline volume 116 to form lubrication volume 202. Any remaining lubricant is the reservoir volume not flowing into the spline volume 116 will flow back though the feed holes 130 until the level of the fluid in the reservoir volume is equal to Eh. As illustrated, the amount that remains in the reservoir volume is shown as volume 204. As will be understood, based on the volume the reservoir toroid and the spline height Sh, the volume 202 will be at or near the same level on every shut down.

Figure 6:
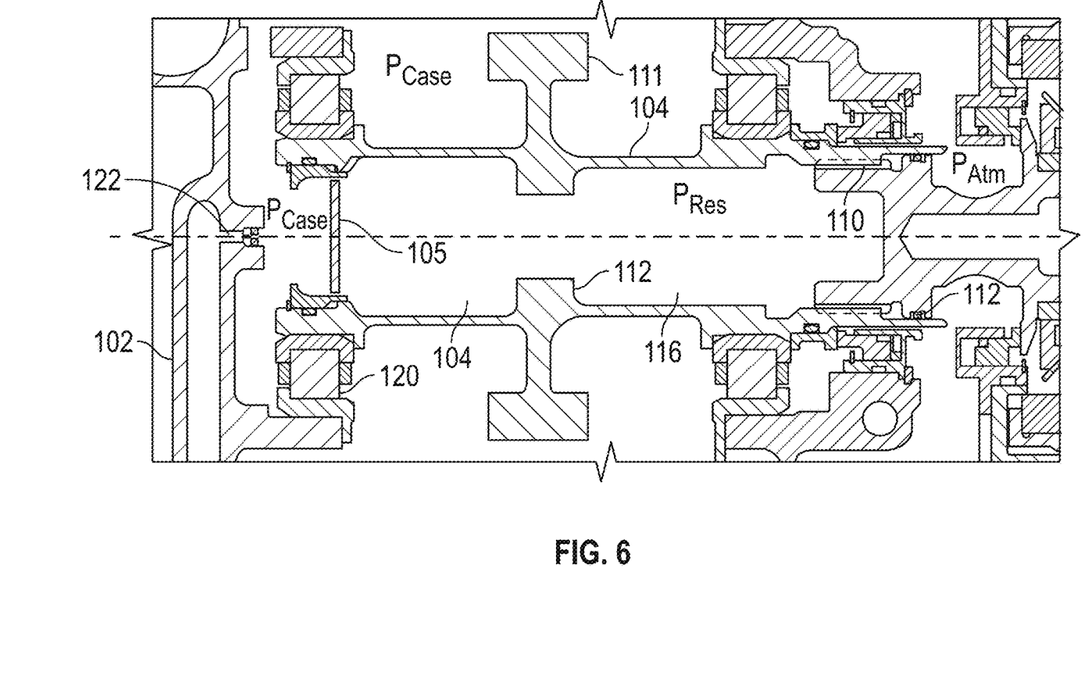
FIG. 6 is a cross-sectional side view of a gear box driving an accessory illustrating various pressures during operation.
Figure 7:
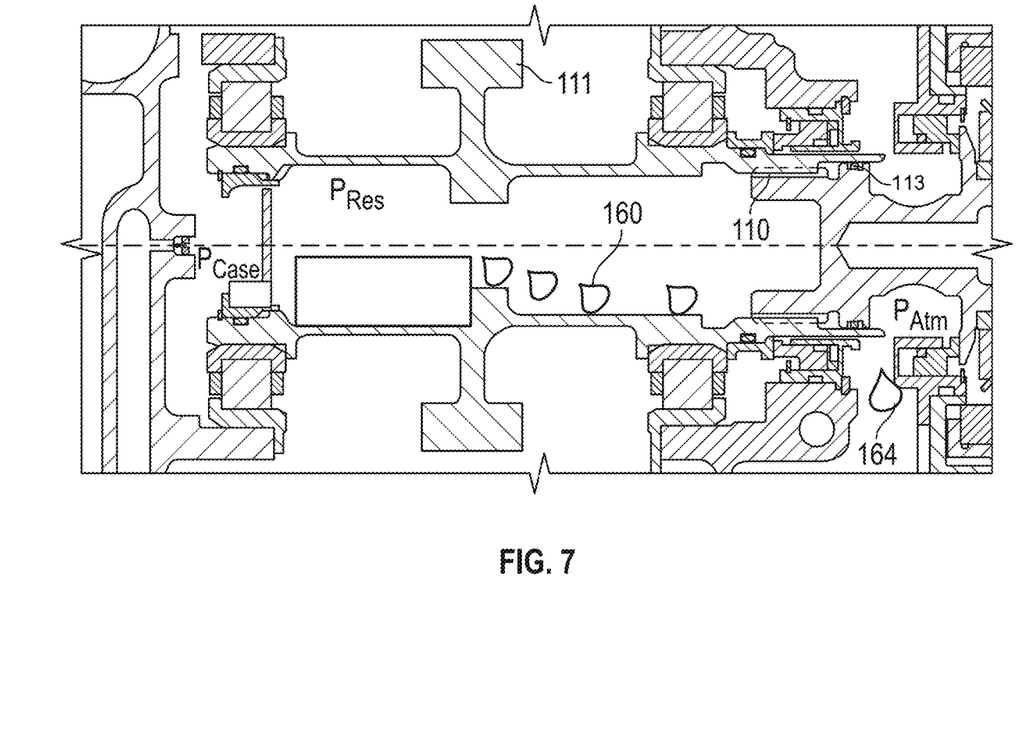
FIG. 7 is a cross-sectional side view of a gear box driving an accessory illustrating various pressures during operation and how lubricant may leak out through the gear box shaft.

With reference to FIGS. 6 and 7, while the aircraft is operating Pcase is at a first level and the pressure (Pres) in the internal region 107 is lower than Pcase. It has been discovered that if Pcase is substantially higher than Pres a manometer mode may arise causing lubricant to be forced over the reservoir dam 112 from the reservoir volume 114 in the spline volume 116. Such fluid is shown as fluid 160. Such a condition may exist if the o-ring 113 is damaged or missing. In such a case, Pres may approach atmospheric pressure Patm. At high altitudes, the Patm may be enough below Pcase that the manometer effect occurs. Further, this extra oil in the spline volume 116 may escape (see fluid 160) to the atmosphere and not be recovered leading to a constant drain on the lubricant tanks (e.g., the aircraft could lose substantial amounts of lubricant).

Figure 8:
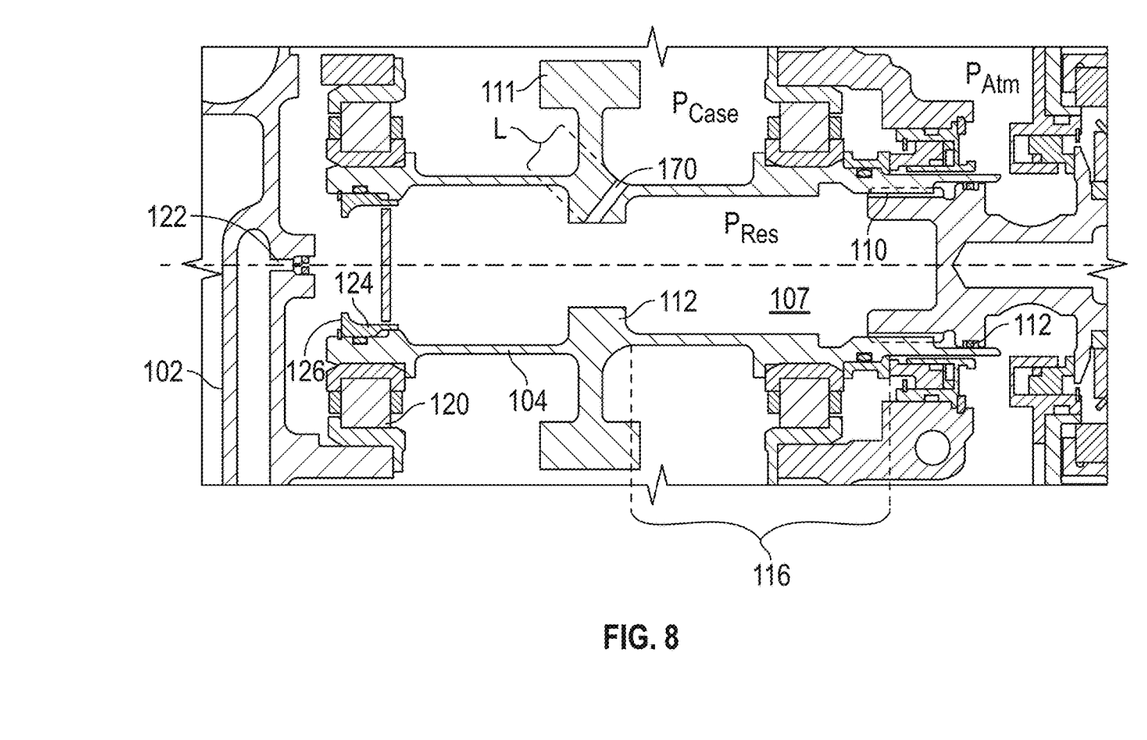

One manner in which the pressure difference may be reduced is to allow pressure from the case to enter the interior region 107 through vent 170 formed through the reservoir dam 112 as shown in FIG. 8. Such a vent may reduce the difference between the Pcase and Pres such that the manometer effect does not occur, even if o-ring 112 is damaged or missing. The vent 170 passes through the dam such that a surface of the dam is in fluid communication with a region defined by the outer housing 102 and outside of the gear box shaft 104. As illustrated, the vent hole 107 passes under the exterior gear 111.

The size of the vent 170 needs to allow for the desired pressurization of the interior region 107 while not allowing too much lubricant to flow back to the case and not over dam 112. That is, if the vent 170 is too small and the required pressurization of the interior region 107 may not occur and if the vent 170 is too large, the lubricant may escape the interior region 107 when the shaft 104 stops spinning without reaching the spline volume 116 during normal operation.

According to one embodiment, the vent 170 is realized by one or more (and in particular, four) equally spaced holes size of Dia 0.125"+/−0.010" at an angle of 50° off the centerline axis. The length (L) of such vents (which affects the pressure drop) is approximately 0.630" in such an embodiment.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A gear box assembly comprising:
an outer housing;
a gear box shaft at least partially disposed in the outer housing, the gear box shaft comprising:
an interior region having two volumes defined therein, the two volumes including a reservoir volume (114) and a spline volume (116), the reservoir volume defined by a reservoir toroid (140) formed by a lubricant during rotation of the gear box shaft and having a height (Rh) and the spline volume defined by a spline toroid formed by the lubricant during rotation of the gear box shaft and having a height (Sh); and
a reservoir dam that extends inwardly into the interior region that separates the interior region into the reservoir volume and the spline volume, the reservoir dam having a vent hole formed therein that passes through it such that a surface of the dam is in fluid communication with a region defined by the outer housing and outside of the gear box shaft the reservoir dam having a height on a first side equal to Rh and on height on a second side equal to Sh, wherein the height on the first side is greater than the height on the second side.

2. The gear box assembly of claim 1, wherein the outer housing includes an exterior gear formed on an outer surface thereof.

3. The gear box assembly of claim 1, further comprising:
a regulator disposed in one end of the gear box shaft that allows lubricant to pass into the interior region.

4. The gear box assembly of claim 3, further comprising:
a lubrication jet that directs lubricant towards the regulator.

5. The gear box assembly of claim 3, wherein the regulator includes:

a base that includes one or more feed holes formed therein;
a tubular sidewall extending from the base; and
a feed dam formed on the tubular side wall.

6. The gear box assembly of claim 5, wherein a height of the feed dam and a length of the tubular sidewall define a feed volume.

7. A power delivery system comprising:
a driven shaft; and
a gear box assembly comprising:
an outer housing;
a gear box shaft at least partially disposed in the outer housing and connected by a spline joint to the driven shaft, the gear box shaft comprising:
an interior region having two volumes defined therein, the two volumes including a reservoir volume (114) and a spline volume (116), the reservoir volume defined by a reservoir toroid (140) formed by a lubricant during rotation of the gear box shaft and having a height (Rh) and the spline volume defined by a spline toroid formed by the lubricant during rotation of the gear box shaft and having a height (Sh); and
a reservoir dam in the interior region that separates the interior region into the reservoir volume and the spline volume, the reservoir dam having a vent hole formed therein that passes through it such that a surface of the dam is in fluid communication with a region defined by the outer housing and outside of the gear box shaft the reservoir dam having a height on a first side equal to Rh and on height on a second side equal to Sh, wherein the height on the first side is greater than the height on the second side.

8. The power delivery system of claim 7, wherein the outer housing includes an exterior gear formed on an outer surface thereof.

9. The power delivery system of claim 7, further comprising:
a regulator disposed in one end of the gear box shaft that allows lubricant to pass into the interior region.

10. The power delivery system of claim 9, further comprising:
a lubrication jet that directs lubricant towards the regulator.

11. The power delivery system of claim 9, wherein the regulator includes a base that includes one or more feed holes formed therein, a tubular sidewall extending from the base and a feed dam formed on the tubular side wall.

12. The power delivery system of claim 11, wherein a height of the feed dam and a length of the tubular sidewall define a feed volume.

* * * * *